United States Patent

Foglar

[11] Patent Number: 5,864,536
[45] Date of Patent: Jan. 26, 1999

[54] METHOD AND APPARATUS FOR ADAPTING A TRANSMISSION BIT RATE OF A DATA MULTIPLEXER OPERATING ACCORDING TO AN ASYNCHRONOUS TRANSFER MODE

[75] Inventor: Andreas Foglar, München, Germany

[73] Assignee: Siemens Aktiengesellschaft, Munich, Germany

[21] Appl. No.: 703,801

[22] Filed: Aug. 28, 1996

[30] Foreign Application Priority Data

Aug. 28, 1995 [DE] Germany ......................... 195 31 611.8

[51] Int. Cl.⁶ ................................................. H04L 12/26
[52] U.S. Cl. .......................................... 370/232; 370/252
[58] Field of Search ..................................... 370/230, 232, 370/233, 235, 236, 252, 253, 522; 395/200.62, 200.63, 64, 65

[56] References Cited

U.S. PATENT DOCUMENTS

| | | | |
|---|---|---|---|
| 5,119,367 | 6/1992 | Kawakatsu | 370/54 |
| 5,402,426 | 3/1995 | Foglar | 370/232 |
| 5,455,826 | 10/1995 | Ozveren | 370/60 |
| 5,701,292 | 12/1997 | Chiussi | 370/232 |
| 5,734,825 | 3/1998 | Lauck | 395/200 |

OTHER PUBLICATIONS

Simon Davis: "The Enhanced Rate Based ABR Scheme", Mar. 29, 1995.

*Primary Examiner*—Chau Nguyen
*Assistant Examiner*—Thinh Vu
*Attorney, Agent, or Firm*—Herbert L. Lerner; Laurence A. Greenberg

[57] ABSTRACT

A method and an apparatus for adapting a transmission bit rate of each individual one of a plurality of connections to an available bit rate capacity in a data multiplexer operating according to an asynchronous transfer mode includes storage in memory of a total available bit rate for all of the connections. An actual bit rate of all of the connections together is continuously ascertained. A difference between the available bit rate and the actual bit rate is continuously calculated. A number of those connections without underloading is continuously ascertained. A continuous recursive calculation of a current fair share value from the former fair share value, of a number of connections without underloading, and of a difference between the available and the actual bit rate, is performed. The fair share value is written in resource management cells, if the current fair share value is less than the value already contained in the resource management cells. The transmission bit rate of each individual connection is adjusted in accordance with the value in the various resource management cells.

11 Claims, 1 Drawing Sheet

METHOD AND APPARATUS FOR ADAPTING A TRANSMISSION BIT RATE OF A DATA MULTIPLEXER OPERATING ACCORDING TO AN ASYNCHRONOUS TRANSFER MODE

BACKGROUND OF THE INVENTION

Field of the Invention

The invention relates to a method and an apparatus for adapting a transmission bit rate of each individual one of a plurality of connections to an available bit rate capacity of a data multiplexer operating according to an asynchronous transfer mode.

An asynchronous transfer mode (ATM) of a standard which is defined by the CCITT (Comitté Consultatif International Télégraphique et Téléphonique) and is described in general in an article entitled: "ATM-High Speed mit drei Buchstaben" [ATM: High Speed in Three Letters], Funkschau 7-1995, pp. 40–43, is a switching method in which information is bundled in cells, and the cells are exchanged not necessarily periodically between a sender and a receiver. In switching the cells, the data of the sender are combined into portions of uniform size, such as so-called packets or cells, which are then each provided with a top line known as a header. The header includes information on the sender and the receiver. The network, for instance, includes interlinked computers as data multiplexers. Each of them reads the headers of the arriving packets and decides accordingly where they should be sent next, so that they come closer to the destination. The data multiplexers can also ascertain whether or not a connecting line has failed, so that they can then choose another route for the data transmission without bothering the sending or the destination computer about it. Under some circumstances, in some systems, the packets are conveyed over different routes and as a result do not arrive in the correct order. In that case, the destination computer must reassemble the packets correctly. A mixup in the arriving packets can also occur if one had to be re-sent because a transmission error had been ascertained. In so-called virtual data packet switching, not only the destination computer but also the path and/or possible detour paths are included in the header of the data packet, so that all of the packets reach their destination over the same route.

In data packet switching, the sender can transmit at high speed while the addressee only receives at a lower speed. The data transmission is thus not interrupted but merely throttled, since excess data packets can be buffer-stored in the data multiplexers. However, data traffic jams can occur if the packet flow exceeds the storage and transmission capacity of the network. Then the various data multiplexers must simply discard packets that they can no longer store in memory or pass on. Methods for discovering and preventing network overloads are therefore important for the further development of data packet switching. In certain services, a minimum data transmission rate must also not be undershot, an example being a video conference, in which a minimum data flow is necessary to prevent the video and audio information from being "chopped up".

In a particular traffic type of asynchronous transfer mode, namely available bit rate (ABR) traffic, the bit rate of the data senders is controlled by the network. In the case of ABR connections, the network continuously ascertains the optimal bit rate for each participant, in order to achieve the maximum possible utilization of the capacity of the connections, and it informs the participants of this in the form of explicit bit rates. The ABR method is described, for instance, in the publication entitled: "The Enhanced Rate Based ABR Scheme" BRAVE-WP1.3-ROK-95001-TD-CC/b, March 1995, and is especially suitable for applications in which the participants are represented by personal computers or servers. Those devices engender stop and go traffic. In other words, phases of maximum bit rate and resting phases can alternate with one another. Both the inactive and the active phases fluctuate quite markedly over time. The phase duration may be in the millisecond range, or in the minute or even hour range, depending on the application. Since both bit rates up to the maximum possible bit rate and pauses, and all of the values in between can occur unpredictably, it is very difficult for the network to multiplex various data senders through one connection using statistical methods. The principle on which the ABR method is based assumes that a plurality of connections together use a given transmission capacity. The transmission capacity is divided "fairly" between the active data senders. The network and the data multiplexer or multiplexers in it in particular have the task of forming a distribution value (known as a fair share) that represents the division among the various data senders, and of informing the data senders of it.

In order to ascertain the fair share, in the simplest case the total transmission capacity available is divided by the number of active connections. As a rule, however, such a distribution is not expedient, since connections can also occur that may be limited to a lesser bit rate than the one allocated to them. The result in that case would actually be non-optimal utilization of the available transmission capacity. A new fair share value is therefore ascertained, which divides the transmission capacity not used by one connection among the other active connections. If another connection is then added, an overload situation quickly arises, since the bit rates of all of the connections together exceed the available transmission capacity. The overload situation persists until the fair share value is suitably adapted. Meanwhile, the excess cells are buffer-stored in the data multiplexer. However, the overload situation may also occur if the limitation to a certain bit rate is, for instance, eliminated. In that case again, adaptation of the fair share value is necessary.

In order to inform the participants of the explicit transmission rate, that is the desired bit weight, special ATM cells, known as capacity management cells (or RM cells, where RM stands for Resource Management) are used. Each participant periodically arranges its cells in a so-called user cell stream, specifically either after a certain period of time or after a certain number of user cells. The receiving participant loops the RM cells back and inverts the directional bit, in order to identify those cells as reverse-flowing RM cells. The data multiplexers update the explicit bit rate field of the returning RM cells only in the event that their current fair share is smaller than the bit rate indicated by the RM cells. Thus the connecting element with the least available capacity determines the transmission rate for the particular connection.

It is desirable for the optimal fair share value to be determined as accurately as possible and automatically in the shortest possible time, and to assign the current fair share automatically to the RM cells moving past.

SUMMARY OF THE INVENTION

It is accordingly an object of the invention to provide a method and an apparatus for adapting a transmission bit rate of a data multiplexer operating according to an asynchronous transfer mode, which overcome the hereinaforementioned disadvantages of the heretofore-known methods and apparatuses of this general type and which meet the demands mentioned above.

With the foregoing and other objects in view there is provided, in accordance with the invention, a method for adapting a transmission bit rate of each individual one of a plurality of connections to an available bit rate capacity in a data multiplexer operating according to an asynchronous transfer mode, which comprises storing in memory a total available bit rate for all of the connections; continuously ascertaining an actual bit rate of all of the connections together; continuously calculating a difference between the available bit rate and the actual bit rate; continuously ascertaining a number of the connections without underloading; continuously recursively calculating a current fair share value from a former fair share value, of the number of connections without underloading, and of the difference between the available and the actual bit rate; writing the fair share value in resource management cells, if the current fair share value is less than a value already contained in the resource management cells; and adjusting the transmission bit rate of each individual connection in accordance with the value in the various resource management cells.

In accordance with another mode of the invention, there is provided a method which comprises ascertaining the actual bit rate of all of the connections together by continuously averaging over a certain number of respective most recently arrived actual bit rates of the individual connections.

In accordance with a further mode of the invention, there is provided a method which comprises ascertaining the actual bit rate of all of the connections together by averaging over a certain number of incident actual bit rates of the individual connections, and subsequently holding the average value until a new average value is formed over a certain number of subsequent actual bit rates of the individual connections, and so forth.

In accordance with an added mode of the invention, there is provided a method which comprises ascertaining the actual bit rate of all of the connections together by addition of an old load being weighted with a factor of less than one, to a current utilization value being weighted by 1 minus the factor.

In accordance with an additional mode of the invention, there is provided a method which comprises ascertaining the actual bit rate of all of the connections together by continuously finding whether or not a cell arriving from the connections includes information about the available bit rate, and allocating a corresponding first value; delaying the first variable; generating a control signal from the current first variable and a delayed earlier first variable; and incrementing, decrementing or neither incrementing nor decrementing a second variable as a function of the control signal.

In accordance with yet another mode of the invention, there is provided a method which comprises assigning a first logic state to an arriving cell having information about the available bit rate, and assigning a second logic state to the other arriving cells; maintaining the second variable unchanged if the delayed and undelayed first variable are equal; incrementing the second variable upon an occurrence of the first state in the undelayed first variable and the second logic state in the delayed first variable; decrementing the second variable upon the occurrence of a second logic state in the undelayed first variable and the second logic state in the delayed first variable; and representing the actual bit rate of all of the connections together, with the second variable.

In accordance with yet a further mode of the invention, there is provided a method which comprises ascertaining the number of those connections without underloading by determining and comparing a period of time since the last time a connection was made with a reciprocal of the fair share value, each time a connection is made; and determining that an underload exists whenever the time period is greater than the first value of the fair share value.

In accordance with yet an added mode of the invention, there is provided a method which comprises calculating the current fair share value by adding the former fair share value to quotients of a difference between command and actual values of a bandwidth and the number of connections without an underload.

In accordance with yet an additional mode of the invention, there is provided a method which comprises providing the quotients of the total band width available and the number of all of the connections as a starting value for the former fair share value.

With the objects of the invention in view there is also provided an apparatus for adapting a transmission bit rate of each individual one of a plurality of connections to an available bit rate capacity in a data multiplexer operating according to an asynchronous transfer mode, comprising means for storing in memory a total available bit rate for all of the connections; means for continuously ascertaining an actual bit rate of all of the connections together; means connected to the storing means and the actual bit rate ascertaining means for continuously calculating a difference between the available bit rate and the actual bit rate; means for continuously ascertaining the number of those connections without underloading; means connected to the calculating means and to the means for ascertaining the number of those connections without underloading, for continuously recursively calculating a current fair share value from a former fair share value, of the number of connections without an underload, and of the difference between the available and the actual bit rate; means connected to the recursive calculating means for writing the fair share value in resource management cells if the current fair share value is less than a value already contained in the resource management cells; and means for adjusting the transmission bit rate of each individual connection in accordance with the value of the respective resource management cells.

With the objects of the invention in view there is additionally provided an apparatus for adapting a transmission bit rate of each individual one of a plurality of connections to an available bit rate capacity in a data multiplexer operating according to an asynchronous transfer mode, comprising a register for storing in memory a total available bit rate for all of the connections; a measuring instrument for continuously ascertaining an actual bit rate of all of the connections together; a subtractor connected to the register and to the measuring instrument for continuously calculating a difference between the available bit rate and the actual bit rate; a device for continuously ascertaining the number of those connections without underloading; a device connected to the subtractor and to the device for ascertaining the number of those connections without underloading, for continuously recursively calculating a current fair share value from a former fair share value, of the number of connections without an underload, and of the difference between the available and the actual bit rate; a device connected to the recursive calculating device for writing the fair share value in resource management cells if the current fair share value is less than a value already contained in the resource management cells; and a device for adjusting the transmission bit rate of each individual connection in accordance with the value of the respective resource management cells.

The invention has the advantage of only requiring little expense and can therefore even be implemented directly in hardware, or in other words without the use of a microprocessor or the like, and as a result the network reaction time is improved considerably.

Other features which are considered as characteristic for the invention are set forth in the appended claims.

Although the invention is illustrated and described herein as embodied in a method and an apparatus for adapting a transmission bit rate of a data multiplexer operating according to an asynchronous transfer mode, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
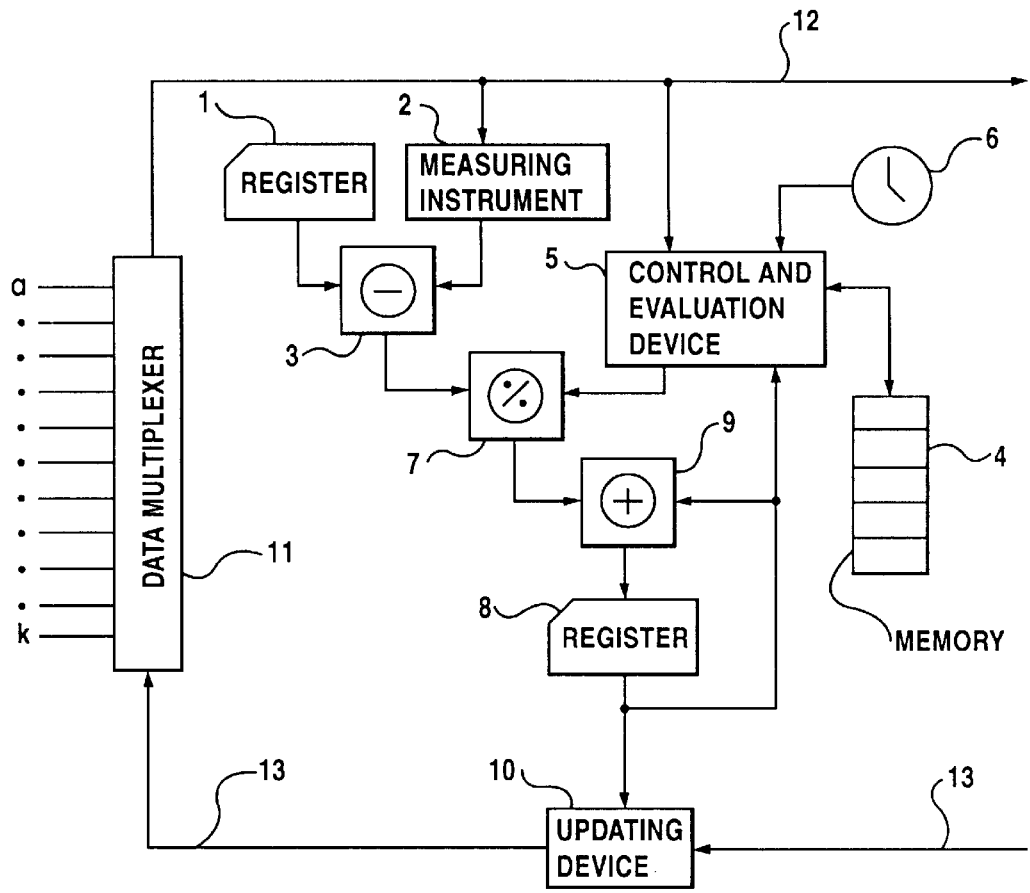
FIG. 1 is a block circuit diagram of one embodiment of an apparatus for performing the method of the invention.

Referring now to the figures of the drawings in detail and first, particularly, to FIG. 1 thereof, it is seen that an apparatus according to the invention for adapting a transmission bit rate of each individual one of a plurality of connections a–k to an available bit rate capacity, in a data multiplexer 11 operating according to an asynchronous transfer mode, includes a register 1, in which the transmission bit rate available for all of the connections a–k together is stored. A measuring instrument 2 is also provided for continuously ascertaining the actual bit rate of all of the connections a–k together and to that end, it reads and evaluates user cells and forward-flowing, inclusive RM cells on a transmission channel 12. Output signals of the register 1 and the measuring instrument 2 are supplied to a subtractor 3, which continuously calculates the difference between these two signals and therefore the difference between the available and the actual bit rate. In the ideal case, the difference is equal to zero. In actuality, however, in most cases it is not equal to zero.

A device is also provided for continuously ascertaining the number of the particular connection without underloading. This device includes a memory 4, in which the time of the last appearance of a user cell in the particular connections is stored. The next time a user cell appears for a certain connection, the arrival time is determined by a control and evaluation device 5, through the use of a time taking unit 6, this time is compared with the previous time stored in the memory 4 and accordingly the time of the then most-recent appearance is stored in the memory 4. The comparison of the current time and the most recent time before it, is carried out in such a way that the time of the most recently appearing time before it is subtracted from the current time, and the resultant difference is compared with the reciprocal of the current allocation value. If the difference between the two times is less than the reciprocal of the current fair share value, then the particular connection is operating in the overload range. Conversely, if it is greater than the reciprocal of the fair share value, then it is in the underload range. It is only in the event that the difference between the two times is equal to the reciprocal of the fair share value that a fair distribution of transmission capacity to the various connections accomplished. The number of connections without an underload is determined from this information by the control and evaluation device 5 and finally supplied to a divider 7. The fair share value may be indicated as cells per second. In that case, the reciprocal of the fair share value is the average period of time between two arriving user cells. In that case, the most recent and the current time value are then also measured in cell cycles. The operating states of overload, optimal operation, or underload are also stored in the memory 4 for each connection together with the time of the last appearance. When these stored data are used, it is simple to then determine the number of connections without an underload by counting downward, setting into motion certain identifying mechanisms when a user cell arrives for the particular connection.

The calculation of the current fair share is carried out recursively, by first dividing the difference which is furnished by the subtractor 3, between the available and the actual bit rate, by the number of connections without an underload, that is furnished by the control and evaluation device 5, with the division being carried out by the divider 7. The quotient which is found therefrom is added in an adder 9 to the former fair share stored in a register 8. The resultant sum forms the new current fair share, which is then written into the register 8. This value is both incorporated into the reverse-flowing RM cells and made available to both the adder 9 and the control and evaluation device 5 for further operations.

In order to prevent complications in the division in the divider 7, in the event that the number of connections without an underload is equal to zero, the quotient is set in that case to equal zero. This means that all of the connections operate in the underload mode and therefore cannot use the fair share. It makes no sense to change the fair share, and therefore the fair share accordingly remains unchanged. The quotient of the total available transmission capacity and the number of all possible connections is preferably chosen as a starting value for the fair share when the system is initialized.

The fair share value is used to update the explicit bit rate field of each reverse-flowing RM cell on a transmission channel 13, which moves past the data multiplexer 11, with the updating being carried out through the use of a device 10. However, the explicit bit rate field of the cells is overwritten only when its value is greater than the current fair share. This is carried out in the same way as an updating of the reverse-flowing RM cells that might under some circumstances be carried out by a cell management device 11. In order to synchronize the register 8 with the reverse-flowing cell stream, the register 8 may be clocked with the cell clock.

Figure 2:
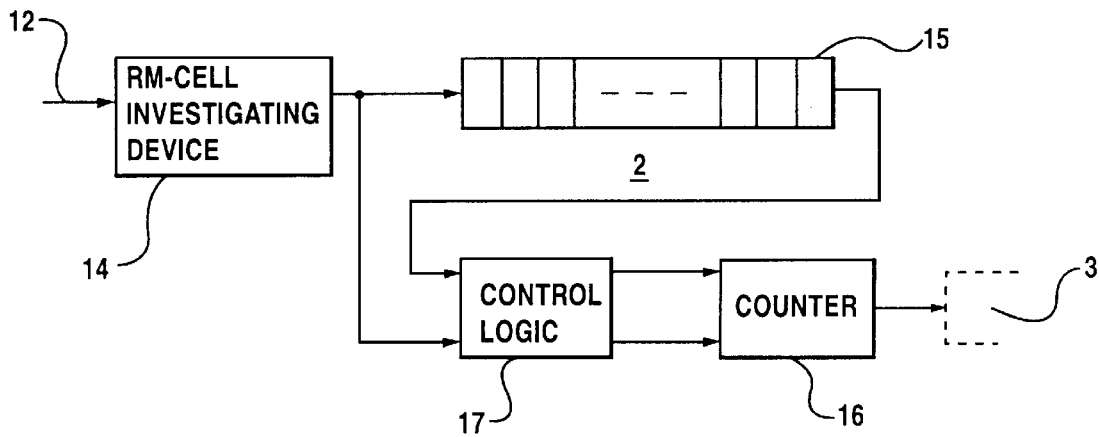
FIG. 2 is a block circuit diagram of a preferred embodiment of an apparatus for ascertaining an actual bit rate of all connections together in the apparatus of FIG. 1.

A preferred embodiment of the measuring instrument 2 for ascertaining the actual bit rate of all of the connections together is shown in FIG. 2. It includes a unit 14, which investigates the forward-flowing stream of RM cells on the transmission channel 12 as to whether they involve an ABR cell or some other cell. According to a present exemplary embodiment, the unit 14 outputs a logic state "1" if the cell is an ABR cell and otherwise it outputs a logical state "0".

The output state of the unit 14 is supplied to both a shift register 15 and a control logic 17. Moreover, the control logic 17 receives the state at the end of the shift register 15. The shift register 15 has a length of 64 bits, for instance, so that a value which is delayed by 64 bits and therefore by 64 arriving cells is supplied at the output of the shift register 15 to the control logic 17. Through the use of the control logic 17, an up/down counter 16 is controlled which in the present exemplary embodiment has a counting width of six bits. The control logic 17 controls the up/down counter 16 in such a way that in the case of equality of the two states applied to the control logic 17, neither a downward nor an upward counting operation is performed. If the state of the output of the shift register 12 equals "1" and the state at the output of the unit 14 is "0", then incrementing is carried out, while if the state at the output of the shift register 12 equals "0" and the state at the output of the unit T.V. 14 equals "1", then decrementing is carried out. The counter state of the up/down counter 16 indicates the number of "1" states contained in the shift register 15, and therefore the actual bit rate of all of the connections together, and is thus supplied to the subtractor 3.

Along with the "sliding window method" shown herein, other methods may also be used in the same way, such as the "jumping window method", the "exponentially-weighted moving average method" and the "leaky bucket method". However, the apparatus described in further detail above excels in offering a fast reaction time and high accuracy at little expense.

In the "exponentially-weighted moving average method", the average value is first formed over a certain number of incident actual bit rates of the individual connections. For instance, the average value of the incident actual bit rates from 1 to n is determined. This average value is retained for the next n bit rates. During that time, the average value for the then-occurring actual bit rates of n+1 through 2n is formed, which is then retained for the next n bit rates, and so forth.

In the "leaky bucket method", the actual bit rate of all of the connections together is ascertained by addition of the old utilization value, multiplied by a factor K that is less than 1, to the current utilization value multiplied by 1 minus the factor k.

I claim:

1. A method for adapting a transmission bit rate of each individual one of a plurality of connections to an available bit rate capacity in a data multiplexer operating according to an asynchronous transfer mode, which comprises:
    a) storing in memory a total available bit rate for all of the connections;
    b) continuously ascertaining an actual bit rate of all of the connections together;
    c) continuously calculating a difference between the available bit rate and the actual bit rate;
    d) continuously ascertaining a number of the connections operating outside an underload range;
    e) continuously recursively calculating a current fair share value from a former fair share value, of the number of connections operating outside an underload range, and of the difference between the available and the actual bit rate;
    f) writing the current fair share value in resource management cells, if the current fair share value is less than a value already contained in the resource management cells; and
    g) adjusting the transmission bit rate of each individual connection in accordance with the value in the various resource management cells.

2. The method according to claim 1, which comprises ascertaining the actual bit rate of all of the connections together by continuously averaging over a certain number of respective most recently arrived actual bit rates of the individual connections.

3. The method according to claim 1, which comprises ascertaining the actual bit rate of all of the connections together by averaging over a certain number of incident actual bit rates of the individual connections, and subsequently holding the average value until a new average value is formed over a certain number of subsequent actual bit rates of the individual connections.

4. The method according to claim 1, which comprises ascertaining the actual bit rate of all of the connections together by addition of an old load being weighted with a factor of less than one, to a current utilization value being weighted by 1 minus the factor.

5. The method according to claim 2, which comprises:
    ascertaining the actual bit rate of all of the connections together by:
    a) continuously finding whether or not a cell arriving from the connections includes information about the available bit rate, and allocating a corresponding first value;
    b) delaying the first variable;
    c) generating a control signal from the current first variable and a delayed earlier first variable; and
    d) incrementing, decrementing or not changing a second variable as a function of the control signal.

6. The method according to claim 5, which comprises:
    assigning a first logic state to an arriving cell having information about the available bit rate, and assigning a second logic state to the other arriving cells;
    maintaining the second variable unchanged if the delayed and undelayed first variable are equal;
    incrementing the second variable upon an occurrence of the first state in the undelayed first variable and the second logic state in the delayed first variable;
    decrementing the second variable upon the occurrence of a second logic state in the undelayed first variable and the second logic state in the delayed first variable; and
    representing the actual bit rate of all of the connections together, with the second variable.

7. The method according to claim 1, which comprises ascertaining the number of those connections operating outside an underload range by:
    determining and comparing a period of time since the last time a connection was made with a reciprocal of the fair share value, each time a connection is made; and
    determining that a connection operates outside an underload range whenever the time period is greater than the reciprocal of the fair share value.

8. The method according to claim 1, which comprises calculating the current fair share value by adding the former fair share value to quotients of a difference between command and actual values of a bandwidth and the number of connections operating outside an underload range.

9. The method according to claim 8, which comprises providing the quotients of the total band width available and the number of all of the connections as a starting value for the former fair share value.

10. An apparatus for adapting a transmission bit rate of each individual one of a plurality of connections to an available bit rate capacity in a data multiplexer operating according to an asynchronous transfer mode, comprising:
    a) means for storing in memory a total available bit rate for all of the connections;

b) means for continuously ascertaining an actual bit rate of all of the connections together;

c) means connected to said storing means and said actual bit rate ascertaining means for continuously calculating a difference between the available bit rate and the actual bit rate;

d) means for continuously ascertaining the number of those connections operating outside an underload range;

e) means connected to said calculating means and to said means for ascertaining the number of those connections operating outside an underload range, for continuously recursively calculating a current fair share value from a former fair share value, of the number of connections operating outside an underload range, and of the difference between the available and the actual bit rate;

f) means connected to said recursive calculating means for writing the current fair share value in resource management cells if the current fair share value is less than a value already contained in the resource management cells; and g) means for adjusting the transmission bit rate of each individual connection in accordance with the value of the respective resource management cells.

11. An apparatus for adapting a transmission bit rate of each individual one of a plurality of connections to an available bit rate capacity in a data multiplexer operating according to an asynchronous transfer mode, comprising:

a) a register for storing in memory a total available bit rate for all of the connections;

b) a measuring instrument for continuously ascertaining an actual bit rate of all of the connections together;

c) a subtractor connected to said register and to said measuring instrument for continuously calculating a difference between the available bit rate and the actual bit rate;

d) a device for continuously ascertaining the number of those connections operating outside an underload range;

e) a device connected to said subtractor and to said device for ascertaining the number of those connections operating outside an underload range, for continuously recursively calculating a current fair share value from a former fair share value, of the number of connections operating outside an underload range, and of the difference between the available and the actual bit rate;

f) a device connected to said recursive calculating device for writing the current fair share value in resource management cells if the current fair share value is less than a value already contained in the resource management cells; and g) a device for adjusting the transmission bit rate of each individual connection in accordance with the value of the respective resource management cells.

\* \* \* \* \*